United States Patent
Barkan et al.

(10) Patent No.: US 6,957,784 B1
(45) Date of Patent: Oct. 25, 2005

(54) BOTTLE CRUSHING SYSTEM

(75) Inventors: Richard A. Barkan, Northfield, IL (US); Dennis Melchiorre, Fox Lake, IL (US)

(73) Assignee: Majestic Industries, Inc., Northfield, IL (US)

( * ) Notice: Subject to any disclaimer, the term of this patent is extended or adjusted under 35 U.S.C. 154(b) by 0 days.

(21) Appl. No.: 11/015,450

(22) Filed: Dec. 17, 2004

(51) Int. Cl.$^7$ ............................ B02C 19/12; B02B 7/02
(52) U.S. Cl. ........................................ 241/99; 241/100
(58) Field of Search ...................... 241/100, 99, 46.013

(56) References Cited

U.S. PATENT DOCUMENTS

| | | | |
|---|---|---|---|
| 3,181,802 A * | 5/1965 | Lung et al. ............. | 241/46.013 |
| 3,432,108 A * | 3/1969 | Enright ................... | 241/46.016 |
| 5,226,606 A | 7/1993 | Jasperson et al. | |
| 5,242,126 A * | 9/1993 | Bomze .................... | 241/99 |
| 5,620,146 A | 4/1997 | Lukas | |
| 5,944,268 A | 8/1999 | Andela | |
| 2003/0066914 A1 * | 4/2003 | Jara-Almonte et al. | 241/46.013 |

* cited by examiner

Primary Examiner—Derris H. Banks
Assistant Examiner—Faye Francis
(74) Attorney, Agent, or Firm—Welsh & Katz, Ltd.

(57) ABSTRACT

A bottle crushing system for breaking apart bottles into fragments includes an enclosure having an upper component containing region and a lower glass receptacle region separated from one another by a support panel. A crushing assembly includes a drive and a rotating crusher element operably connected thereto. The drive is disposed above the support panel, within the upper component containing region and the rotating crusher element is disposed below the support panel within the lower glass receptacle region. A chute assembly has an entrance opening in the enclosure for introducing bottles to the crushing system and traverses through an opening in the support panel. The chute system has a discharge at the crusher element that is positioned immediately above the rotational path of the crusher element. The chute system includes a pair of baffle element sets. An upper baffle element set is disposed immediately inside of the entrance opening and includes first and second flexible membranes having slits formed therein so as to define at least six flexible panels in the membrane. The sits are offset from one another. A lower baffle element set is disposed intermediate the entrance opening and the discharge and has slits formed therein so as to define at least six flexible panels in the membrane.

15 Claims, 2 Drawing Sheets

BOTTLE CRUSHING SYSTEM

BACKGROUND OF THE INVENTION

The present invention pertains to the crushing and compaction of glass bottles for disposal. More particularly, the present invention pertains to the on-site crushing of glass for volume reduction, compaction and subsequent disposal and/or recycling.

In many food service establishments, for example, restaurants and lounges, the storage of empty glass containers such as soft drink bottles, beer bottles, wine bottles and the like, poses problems due to limited storage space and accidental breaking which can result in hazardous conditions. Moreover, regardless of how they are disposed of, bottles require storage space prior to being carted away to a disposal or recycling facility. That is, the bottles must be stored until transportation for recycling or disposal can be arranged.

As a result, valuable floor space is often wasted on storing empty bottles in crates or other containers until the bottles can be delivered to or picked up by a disposal or recycling facility. The use of storage space can become an acute problem in bars and restaurants where large numbers of empty glass bottles can result from even one evening's operation.

Even at establishments that do not recycle (that is where bottles are disposed of as trash) storage is a concern because of the time and effort required in handling and transporting the bottles. In a bar, for example, trash bins located behind the bar tend to fill quickly since each empty bottle takes up a considerable volume in the bin. As a result, bottle or trash bins must be manually carried (and generally frequently) to a dumpster that may be located outside of the building. In addition, the bottle bins (behind the bar) can take up valuable space and can interfere with the efficient movement of the bartender or waiter.

In an effort to address this problem, devices are known that pulverize glass bottles and contain the pulverized glass. Such devices use a pulverizing blade located within a somewhat isolated chamber to reduce the glass volume by breaking the bottles into small pieces of glass. However, such devices produce glass shards and/or glass dust, and often cannot adequately contain the pulverized glass. It has been found that in such known system, glass shards and "dust" tend to escape into the surrounding areas and the glass that is pulverized often is not in sufficiently small fragments to permit readily handling the glass material.

Accordingly, there is a need for a bottle crushing system. Desirably, such a system is self-contained within a relatively small package or unit. More desirably, such a system crushes the glass within an isolated chamber such that glass shards are retained within the chamber. Most desirably, such a system eliminates regions, such as in brushes or the like, in which contamination can collect resulting in bacterial growth.

BRIEF SUMMARY OF THE INVENTION

A bottle crushing system is configured for breaking apart bottles into fragments. An enclosure has an upper component containing region and a lower glass receptacle region. The upper and lower regions are separated from one another by a support panel.

A crushing assembly includes a drive and a rotating crusher element. The drive is disposed above the support panel, within the upper component containing region and the rotating crusher element is disposed below the support panel within the lower glass receptacle region. The crusher element rotates to define a rotational path.

A chute assembly has an entrance opening in the enclosure top for introducing bottles to the crushing system. The chute traverses through an opening in the support panel and has a discharge at the crusher element. The discharge is positioned immediately above the rotational path of the crusher element. The chute system includes a pair of baffle element sets. An upper baffle element set is disposed immediately inside of the entrance opening and includes first and second flexible membranes having slits formed therein so as to define at least six, and preferably eight flexible panels in the membrane. A lower baffle element set also includes first and second flexible membranes having slits formed therein so as to define at least six, and preferably eight flexible panels in the membrane. The membranes of each set are angularly offset from one another. The upper and lower baffle element sets are spaced from one another along the chute assembly.

A funneling chamber is disposed below and mounted to the support panel. The funneling chamber has a generally circular, inwardly tapering wall extending downwardly, away from the support panel, and defines a crushed glass discharge opening. Glass bottles are introduced into the chute assembly and are urged through the upper and lower baffle element sets into the crushing assembly. The bottles are crushed by the rotating crusher element and are directed by the funneling chamber into a receptacle positioned in the receptacle region. The crusher element is sized so that the distance between the ends of the element and the funnel wall is less than about ½ inch an so that the distance between the end of the chute and the element is about $30/1000$ inch (30 mils).

Preferably, the funneling chamber wall is formed at an angle of about 45 degrees to the vertical. To further enhance the retention of the crushed glass within the receptacle region, a flexible sealing membrane is positioned around the outside of the funneling chamber.

The flexible panels in the upper and lower baffle element sets are formed by four equally radially spaced slits (to form the eight panels, each). In a present embodiment, the membranes of each set have different thicknesses from one another. The panels of each set are angularly offset from one another.

The lower baffle element set can be configured between plates each plate having a sleeve extending from a side thereof opposite of the membranes. In this manner, the sleeves can have differing diameters so that the chute assembly portions fit together in only one orientation.

Alternately, the system can be configured having the chute entrance opening is in a side of the enclosure and the chute assembly is formed at an angle to the vertical. In this embodiment, the upper baffle element set is formed oriented parallel to the side of the enclosure and the lower baffle element set is formed generally perpendicular to (i.e., across) the chute assembly. The side entrance configuration can include a spring biased gate.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 2:
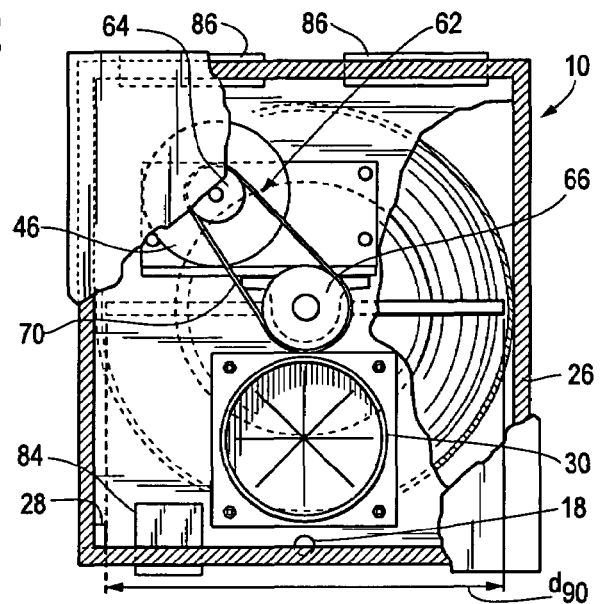
FIG. 2 is a top view of the system shown with a part of the top wall removed.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment, size or shape illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 1:
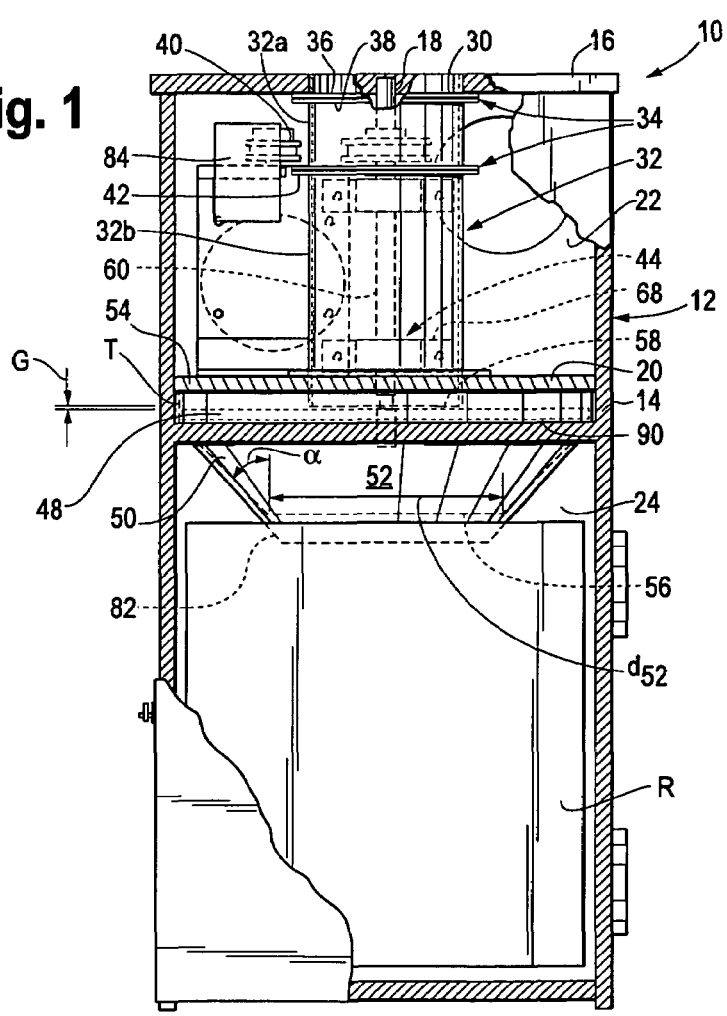
FIG. 1 is a front view of one embodiment of a bottle crushing system in accordance with the principles of the present invention, the system being shown with a portion of the side wall removed.

Referring now to the figures and in particular to FIG. 1, there is shown a bottle crushing system 10 embodying the principles of the present invention. The crushing system 10 is provided as a compact, self-contained unit within a closed housing or enclosure 12 having, generally, a body 14 and a top 16. In a present embodiment, the top 16 is affixed to the enclosure body 14 by a fastener 18, such as a bolt to prevent arbitrarily removing the top 16, while permitting ready access for system maintenance. A separating or support panel 20 is disposed within the enclosure 12 to separate the enclosure into an upper mechanical equipment containing region 22 and a lower crushed glass receptacle region 24. The fastener 18 is configured such that it can be loosened (from inside of the cabinet receptacle region 24) with the fastener 18 remaining in place, so that the top 16 can be removed.

An access door 26 is positioned on the body 14 for access to the receptacle region 24. The access door 26 is preferably hingedly mounted to the body 14 and a safety switch 28 is positioned in the body 24 to isolate power to the system 10 when the door 26 is opened. The safety switch 28 thus requires that the door 26 is closed in order to operate the crusher system 10.

The enclosure top 16 includes a circular opening 30 for inserting bottles. As will be described in more detail below, the opening 30 defines the top of a chute assembly, illustrated generally at 32 (formed from a plurality of elements), that includes a novel baffle system 34 having plural diaphragms or membranes 36, 38 and 40, 42 extending across the chute assembly 32 at various, predetermined locations. The opening 30 is sized to accommodate bottles such as beer bottles, soda pop bottles, wine bottles and the like.

The front view of the system 10 shown in FIG. 1 best illustrates the enclosure 12, separating panel 20 and mechanical components, including a crushing assembly 44. The crushing assembly 44 includes a drive 46, such as the illustrated electric motor drive, that drives a crushing element 48. In a present embodiment, the crushing element 48 is a rotating bar. The crushing assembly 44 further includes a cowl 50 that forms or defines a funneling chamber 52 located on a bottom or lower surface 54 of the support panel 20. The cowl 50 that defines the funneling chamber 52 is a funnel-shaped element that narrows, relatively steeply, to form a restricted bottom opening 56. The funnel shape facilitates crushing of the glass and, it is believed, maintains the glass in intimate contact with the rotating bar 48 to crush the glass into sufficiently small pieces such that the glass does not pose a significant personnel risk. The bar 48 is positioned immediately below the chute opening 58, within the funneling chamber 52 to contact the glass it exits the chute assembly 32.

In a present embodiment, a drive shaft 60 is operably mounted to the crushing element 48 and the drive (motor) 46 is operably mounted to the shaft 60 by a belt drive 62. A drive pulley 64 is mounted to the motor 46 and a driven pulley 66 is mounted to the shaft 60 for driving the shaft 60 and bar 48. A pair of bearings 68 maintains the shaft 60 radially and longitudinally fixed. Preferably, the motor 46 is mounted so that tension in the belt 70 can be adjusted, such as by an arrangement (not shown) having bolts and a mounting plate with notched openings to permit moving the motor 46 toward and away from the shaft pulley 66.

Figure 3:
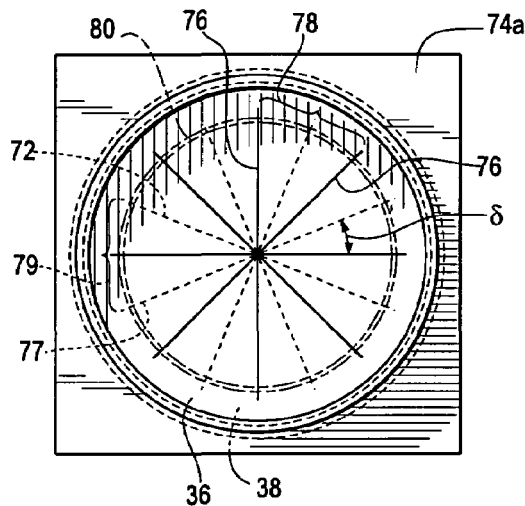
FIG. 3 is a top view of a baffle element set of the system.
Figure 4:
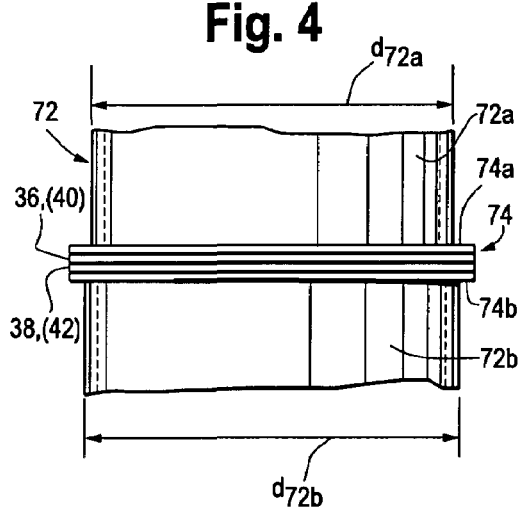
FIG. 4 is a side view of the baffle element set of FIG. 3 illustrated with the plate and sleeve support assembly.

Referring to FIGS. 1 and 3–4, the chute assembly 32 includes a series of sleeves 72 and plates 74 in which two circular sleeves 72a,b and plates 74a,b are mated to one another (at the plates 74) with multiple flexible elements 36, 38 and 40, 42 (rubber baffle elements) fixed between the plates 74a,b. In this manner, the baffle elements 36, 38 and 40, 42 are fixed between the plates 74a,b with circular sleeves 72a,b on either side. The sleeves 72a,b are configured having differing diameters $d_{72a}$, $d_{72b}$ so that the sleeves 72a,b will fit together and fit within the crushing system 10 in only one configuration and orientation.

In a present chute assembly 32, two sets of baffle (flexible) elements 36, 38 and 40, 42 are present to isolate the glass receptacle region 24 (and thus the crushing region within the funneling chamber 52) from the environs. An upper set of baffle elements 36, 38 is formed from two flexible elements, an upper, thinner element or membrane 36 (about 1/16 inch thick) and a lower, thicker element or membrane 38 (about 3/16 inch thick). The lower set of baffle elements 40, 42 is also formed from a pair of membranes: an upper, thinner element or membrane 40 (about 3/32 inch thick) and a lower, thicker element or membrane 42 (about 3/16 inch thick). Although the chute 32 has a constant inside diameter (about 6 inches), the outside diameter of an upper chute portion 32a is smaller than an outside diameter of a lower chute portion 32b to facilitate system 10 maintenance. It should also be noted that the element sets 36/38 and 40/42 are located along the chute 32 so as to readily permit inserting bottles into the chute 32 while maintaining isolation to prevent the escape of glass fragments. In a present system, the upper elements 36/38 are located just under the top 16 and the lower elements 40/42 are located about 3 inches to about 5 inches from the upper elements 36/38.

The elements 36–42 each have four slits 76, 77 formed therein to define eight pie-shaped panels 78, 79, which provide a self-closing aperture (when the panels 78, 79 are separated or urged open) through which bottles are inserted. The panels 78, 79 flex open to accept bottles and are sufficiently resilient to close following passage of the bottles. The membrane 36–42 material is also sufficiently rigid that it returns to its original shape or orientation. In a present crushing system 10, the membranes (elements) 36–42 are formed from Buna-N, however, it is anticipated that other suitable materials, such as common rubber can also be used. Preferably, the membrane material is of a non-degrading, fungus resistant material.

It will be appreciated that the slits 76 define panels 78 in the upper membranes 36 and 40; likewise, slits 77 defines panels 79 in the lower membranes 38 and 42. The slits 76 and 77 of each set are offset from one another so that the panels 78 and 79 of each set are offset from one another. In FIG. 3 the slits 76 and panels 78 in the upper membrane 36 are shown in solid lines whereas the slits 77 and panels 79 of the lower membrane 38 are shown in phantom lines to provide a perspective of the arrangement. Viewed another way, the panels 78 in membrane 36 overlie the slits 77 in membrane 38. This same arrangement is present in the lower membranes 40 and 42. In this manner, the slits 76 of each of the upper membranes 36, 40 are offset from the slits 77 of the respective lower membranes 38, 42 by and angle $\delta$ of about 22.5 degrees. It has been found that the thicker lower membranes 38, 42, in conjunction with the offset slits 76, 77 results in substantially no glass shards or glass "dust" escaping from the receptacle region 24 and funneling chamber 52.

Optionally, an elastic element 80 can be affixed to the membranes 36–42, around the periphery of the panels 78, 79 (just inside of the far ends of the slits 76, 77), to assist return of the panels 78, 79 to the closed position.

In order to facilitate maintaining isolation of the receptacle region 24 and funneling chamber 52 from the environs, each set of baffle elements 36, 38 and 40, 42 independently seals about a bottle (if a bottle is inserted into the element) or about itself (if no bottle is present in the element). It has been found that the sets of elements 36, 38 and 40, 42 provide adequate isolation to prevent the escape of glass shards and/or dust.

Also to enhance isolation of the receptacle region 24 and funneling chamber 52 from the environs (and from the upper mechanical component region 22), the cowl 50 forming the funneling region 52 has a rubber boot or skirt 82 positioned around the outside thereof. In addition to preventing egress of glass fragments (shards and "dust"), the rubber boot 82 also serves as a sound attenuator to reduce the noise produced by the operating crushing system 10. The boot 82 can also extend beyond the end of the cowl 50 so as to better direct the crushed glass into the glass receptacle R.

The system 10 includes a power (on-off) switch 84, preferably a light-indicating switch located on the housing 12. One or more cooling fans 86 are located in the housing 12 (in the mechanical component containing region 22) to prevent the motor 46 and bearings 68 from overheating during operation.

The glass is crushed to a desired size that is determined by the speed at which the crushing element 48 rotates, the diameter and configuration of the funnel chamber 52 and by the gap G between the bar 48 and the end discharge end 58 of the chute assembly 32. To this end, the closer the tolerance (e.g., the smaller the gap T) between the tips of the bar 48 and the interior surface of the funnel chamber 52, the smaller the size of the glass fragments. Likewise, the faster the rotational speed of the element 48, the smaller the size of the glass fragments. And, the smaller the gap G between the discharge end 58 of the chute 32 and the bar 48, the smaller the fragments. In a present system, the distance T between the ends of the bar 48 and the inner wall of the funnel chamber 52 is about no more than ½ inch. Also in a present system, the funnel 52 has an upper opening 90 diameter $d_{90}$ of about 17 inches, a lower discharge opening 56 diameter $d_{56}$ of about 9 inches, and is formed with the side walls having angle $\alpha$ of about 45° (and having a length of just over 5 inches). The gap G between the discharge end 58 of the chute assembly 32 and the bar 48 is about 0.030 inches (about 30 mils). To maintain the smallest practicable distance between the ends of the bar 48 and the wall of the funnel 52, the bar has a length of no less than about 16 inches.

To permit ready maintenance of the bar 48 and the funnel 52, the funnel is held in place by a flange-like collar portion having four corner blocks 84 that essentially form a flange that fits over the funnel. The blocks 84 (forming the flange) are held in place by fasteners 85 that are accessible from the receptacle region 24. In this manner, the fasteners 85 can be removed and the funnel 52 readily removed (from below) for access to the bar 48.

Figure 5:
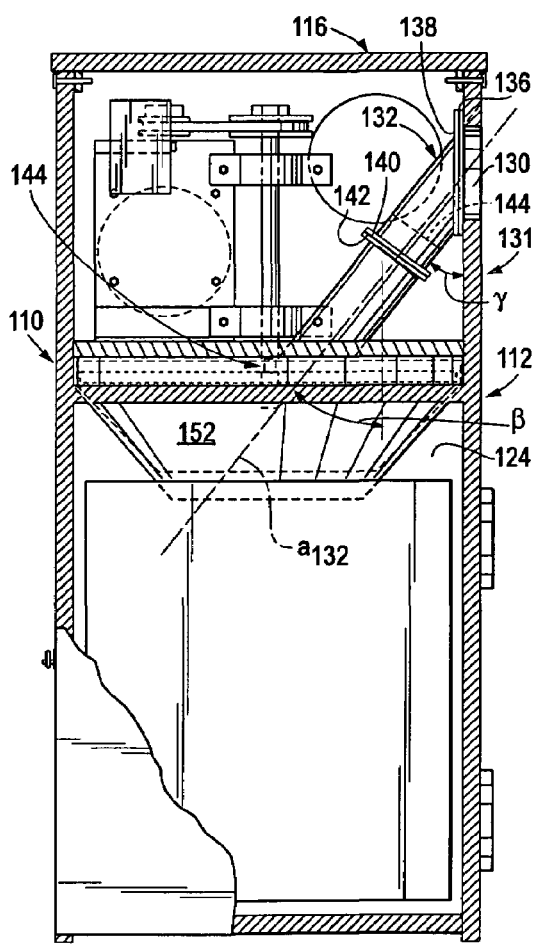
FIG. 5 is a front view of an alternate embodiment of the bottle crusher system.

An alternate embodiment of the crushing system 110 is illustrated in FIG. 5. In this embodiment, the entrance opening 130 is located on a side 131 of the housing 112, rather than the top 116 of the unit 110. The funnel 152 and receptacle 124 regions are similar to those of the embodiment 10 of FIGS. 1–4. However, to accommodate the side bottle entrance 130, the chute assembly 132 is formed at an angle $\beta$ to the vertical. In this embodiment of the system 110 one set of baffle elements (a lower set 140, 142) is oriented perpendicular to the longitudinal axis $a_{132}$ of the chute 132 and an upper baffle element set 136, 138 is disposed at the entrance 130 to the chute 132 on the side 131 of the enclosure 112 at an angle $\gamma$ to the chute axis $a_{132}$. In addition, one or more biased or spring-actuated barriers 143 (e.g., doors) can be positioned (in addition to the baffle element sets 136–142) within the chute assembly 132 to further enhance crushing assembly 144 isolation. In such a side entrance system 110, the top 116 of the enclosure 112 can then be used for storage, additional counter-top space or the like.

The enclosures 12, 112 are sized to accommodate a five gallon garbage pail R, but can be configured in a wide variety of sizes and configurations. It will, however, be appreciated that practical considerations govern, and that the weight of the glass in the pail R will limit the quantity of bottles that can be crushed. Otherwise, the weight of the pail R and glass will be too great for easy (manual) handling.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A bottle crushing system for breaking apart bottles into fragments, comprising:
    an enclosure having an upper component containing region and a lower glass receptacle region, the upper and lower regions being separated from one another by a support panel;
    a crushing assembly including a drive and a rotating crusher element operably connected thereto, the drive being disposed above the support panel, within the upper component containing region and the rotating crusher element being disposed below the support panel within the lower glass receptacle region, the crusher element defining a rotational path;

a chute assembly having an entrance opening in the enclosure for introducing bottles to the crushing system and traversing through an opening in the support panel, the chute system having a discharge at the crusher element, the discharge being positioned immediately above the rotational path of the crusher element, the chute system including a pair of baffle element sets, an upper baffle element set being disposed immediately inside of the entrance opening and including first and second flexible membranes having slits formed therein so as to define at least six flexible panels in the membrane, a lower baffle element set having first and second flexible membranes being disposed intermediate the entrance opening and the discharge and having slits formed therein so as to define at least six flexible panels in the membranes, the upper and lower baffle element sets being spaced from one another along the chute assembly; and a funneling chamber disposed below the support panel, and mounted thereto, the funneling chamber having a generally circular, inwardly tapering wall extending downwardly, away from the support panel, and defining a crushed glass discharge opening, wherein glass bottles introduced into the chute assembly are urged traverse through the upper and lower baffle element sets into the crushing assembly, are crushed by the rotating crusher element and are directed by the funneling chamber into a receptacle positioned in the receptacle region.

2. The bottle crushing system in accordance with claim 1 wherein the funneling chamber wall is formed at an angle of about 45 degrees to the vertical.

3. The bottle crushing system in accordance with claim 1 including a flexible sealing membrane positioned around the outside of the funneling chamber.

4. The bottle crushing system in accordance with claim 1 wherein the membranes have eight flexible panels formed therein.

5. The bottle crushing system in accordance with claim 4 wherein the flexible panels are formed by four equally radially spaced slits.

6. The bottle crushing system in accordance with claim 1 wherein the slits of the first and second flexible membranes of the upper baffle element set are offset from one another and wherein the slits of the first and second flexible membranes of the lower baffle element set are offset from one another.

7. The bottle crushing system in accordance with claim 1 wherein the membranes have different thicknesses from one another.

8. The bottle crushing system in accordance with claim 1 wherein the upper membrane of each set of membranes is thinner than the lower membrane of each set of membranes.

9. The bottle crushing system in accordance with claim 1 wherein the flexible panels of each of the membranes are formed by four equally radially spaced slits.

10. The bottle crushing system in accordance with claim 1 wherein the lower baffle element set is disposed between plates each plate having a sleeve extending from a side thereof opposite of the membranes.

11. The bottle crushing system in accordance with claim 1 wherein the chute entrance opening is in a top of the enclosure and wherein the chute assembly is substantially vertical.

12. The bottle crushing system in accordance with claim 1 wherein the chute entrance opening is in a side of the enclosure and wherein the chute assembly is formed at an angle to the vertical.

13. The bottle crushing system in accordance with claim 12 wherein the upper baffle element set is formed oriented parallel to the side of the enclosure and wherein the lower baffle element set is formed generally perpendicular to a longitudinal axis of the chute assembly.

14. The bottle crushing system in accordance with claim 12 wherein the chute assembly includes at least one spring biased gate.

15. The bottle crushing system in accordance with claim 1 including a door mounted to the enclosure for enclosing the lower glass receptacle region and including a switch cooperating with the door so as to isolate electrical power to the crushing assembly drive when the door is in an open position and to provide power to the crushing assembly drive when the door is in a closed position.

\* \* \* \* \*